Patented Jan. 8, 1929.

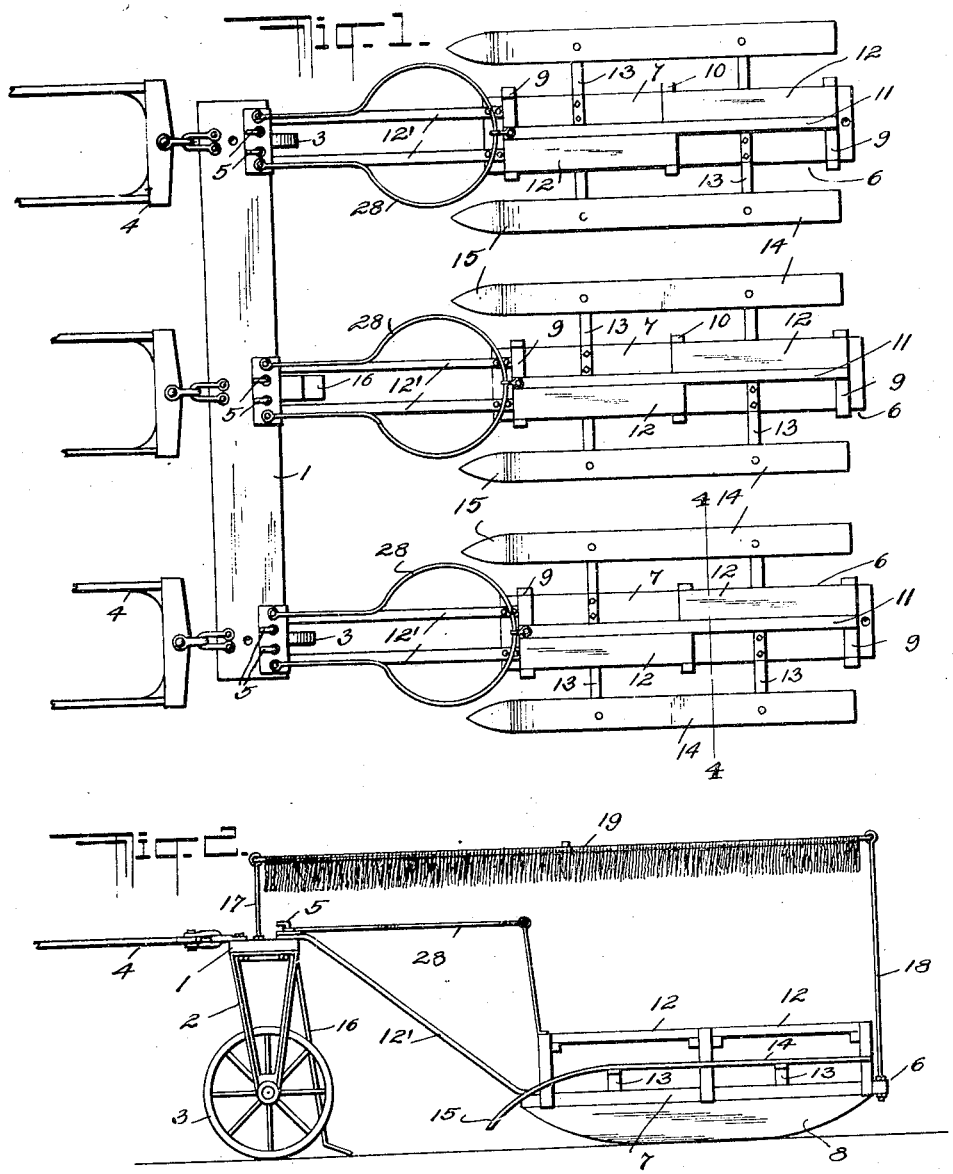

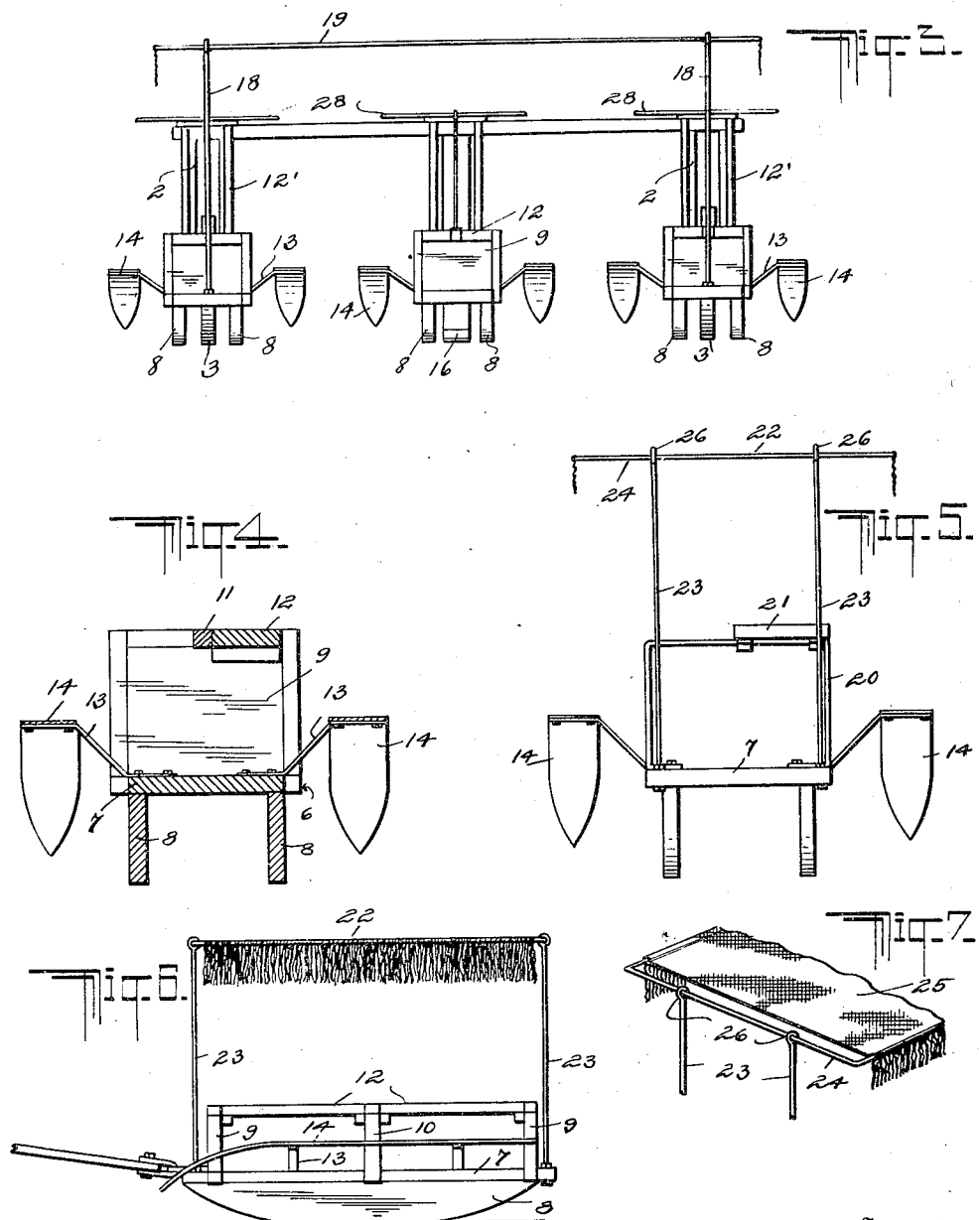

1,698,125

UNITED STATES PATENT OFFICE.

BENITO J. DONADA, OF REFUGIO, TEXAS.

VEHICLE FOR MANUAL COTTON PICKERS.

Application filed April 19, 1924. Serial No. 707,552.

The present invention is directed to improvements in devices to be used for picking cotton or thinning or cultivating the plants.

The primary object of the invention is to provide a device of this character so constructed that a number of persons can be comfortably seated in convenient positions to pick cotton from the bolls or cultivate the growing plants.

A further obect of the invention is to produce a device of this character constructed in such manner that one or more trailers are provided for supporting cotton pickers and enable them to conveniently pick cotton, thin the plants or cultivate the ground.

With these and other objects in view, as will appear as the description proceeds, the invention consists in the novel features of construction, combinations of elements and arrangements of parts, and hereinafter to be fully described and claimed.

In the accompanying drawing:

Figure 1 is a top plan view of the device,

Figure 2 is a side elevation thereof,

Figure 3 is a rear elevation,

Figure 4 is a sectional view on line 4—4 of Figure 1,

Figure 5 is a rear elevation of a slightly modified form of the invention,

Figure 6 is a side elevation of a single trailer adapted to be drawn by one horse, and Figure 7 is a detail perspective view of the adjustable form of canopy.

Referring to the drawings, 1 designates a draft bar having brackets 2 at each end to which are rotatably connected the wheels 3. This bar has secured thereto a plurality of swingletrees 4 to which draft animals are hitched to draw the device across a field. It will be of course understood that a tractor may be used in place of the draft animals, if desired.

While I have shown the swingletrees connected to the draft bar 1 it is obvious that the connection may be made with any suitable portion of the frame of my device or direct to the trailer.

Fixed to the draft bar 1 are sets of paired hooks 5, the purpose of which will appear later.

Associated with the bar 1 is a plurality of trailers 6, preferably three in number. Each trailer comprises a platform 7 and runners 8 to permit the same to be easily drawn over the field, and if desired wheels may be substituted for the runners. Fixed upon the ends of the platform are supports 9 and an intermediate support 10, there being a longitudinal centrally located bar 11 supported upon said supports. Detachably engaged with the supports are seats 12, said seats being capable of being shifted from one side of the bar 11 to the other to enable the seats to be diagonally disposed, as clearly shown in Figure 1, to enable the pickers to face opposite directions and to provide adequate foot room upon the platform. The trailers are provided with draw bars 12', the forward ends of which are detachably engaged with the hooks 5.

Fixed to the sides of the platform 7 are brackets 13 which support the fenders 14, said fenders having their forward ends curved downwardly, as at 15, whereby the lower branches of the cotton plants will be lifted into convenient reach of the pickers occupying the seats 12. To steady the draw bar 1 a ground engaging bar 16 is provided and has its upper end fixed to the center of the bar 1.

As shown in Figure 2 of the drawing the bar 1 and trailer 6 have supported thereby vertical rods 17 and 18, respectively, which serve to support the canopy 19, said canopy serving to shield the pickers from the sun.

In Figure 5 is shown a slightly modified form of the invention, the platform 7 of the trailer having arch bars 20 carried thereby upon which a seat 21 is mounted, said seat being capable of being slid transversely to permit the pickers to conveniently gather the cotton or cultivate the plants upon opposite sides of the platform. A canopy 22 is supported above the seat 21 by rods 23. The canopy 22 may consist of frame rods 24 connected by a suitable fabric member 25 (as shown more clearly in Figure 7), the side frame rods being mounted to slide in eyes 26 on the ends of the standards 23. By this construction it is obvious that the canopy may be readily moved backward or forward to conform to the position of the sun.

Supported by the bar 1 is a wire loop 28 which serves to support a bag for containing the picked cotton.

As indicated more clearly in Figure 6 of the drawing a single trailer may be employed if desired instead of a plurality of trailers, thus reducing expense of construction and permitting the use of but one horse, this single construction admits of the horse being attached as shown in Figure 6 to a comparatively low point of the frame work of the trailer.

What is claimed is:

In a vehicle for manual cotton pickers, a portable frame of sufficient width to pass between adjacent rows of cotton plants, a longitudinally extending seat structure on said frame, and longitudinally extending fenders connected to said frame and extending longitudinally thereof on opposite sides of said frame throughout substantially its length and curved down-turned extensions provided on the forward ends of said fenders to engage the lower branches of said plants to elevate the same to the plane substantially of said seat structure.

In testimony whereof I affix my signature.

BENITO J. DONADA.